(12) United States Patent
Mizutani et al.

(10) Patent No.: US 10,768,293 B2
(45) Date of Patent: Sep. 8, 2020

(54) OBJECT DETECTING APPARATUS USING REFLECTION POINT INFORMATION OF OBJECT

(71) Applicant: DENSO CORPORATION, Kariya, Aichi-pref. (JP)

(72) Inventors: Akiyoshi Mizutani, Kariya (JP); Ryusuke Uyama, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 290 days.

(21) Appl. No.: 15/532,038

(22) PCT Filed: Dec. 1, 2015

(86) PCT No.: PCT/JP2015/083734
§ 371 (c)(1),
(2) Date: May 31, 2017

(87) PCT Pub. No.: WO2016/088752
PCT Pub. Date: Jun. 9, 2016

(65) Prior Publication Data
US 2017/0315224 A1    Nov. 2, 2017

(30) Foreign Application Priority Data
Dec. 1, 2014    (JP) .................. 2014-243324

(51) Int. Cl.
*G01S 13/58*    (2006.01)
*G01S 7/35*    (2006.01)
(Continued)

(52) U.S. Cl.
CPC ............ *G01S 13/584* (2013.01); *G01S 7/352* (2013.01); *G01S 13/931* (2013.01); *G01S 13/34* (2013.01);
(Continued)

(58) Field of Classification Search
CPC ...... G01S 13/584; G01S 7/352; G01S 13/931; G01S 2013/9321; G01S 13/34; G08G 1/165; G08G 1/166
(Continued)

(56) References Cited

U.S. PATENT DOCUMENTS 5,710,565 A    1/1998    Shirai et al.
2011/0006941 A1    1/2011    Samukawa et al.
(Continued)

FOREIGN PATENT DOCUMENTS

JP    H08-279099 A    10/1996
JP    2000-98028    4/2000
WO    2013-146375 A1    10/2013

OTHER PUBLICATIONS

Machine translation of WO2013-146375 (Year: 2013).*
Machine Translation of JP2000-98028 (Year: 2000).*

*Primary Examiner* — Frank J McGue
(74) *Attorney, Agent, or Firm* — Maschoff Brennan (57) ABSTRACT

An object detecting apparatus includes reflecting point detecting means, reflecting point setting means, rear-end positional information generating means and object detecting means. The reflecting point detecting means detects position and speed of reflecting point reflecting radar waves. The reflecting point setting means sets high and low level reflecting points, the high level reflecting point having reflection intensity higher first detecting threshold, and the low level reflecting point having reflection intensity higher than second detecting threshold and lower than the first detecting threshold. The rear-end positional information generating means checks whether or not a low level reflecting point is present satisfying a same object condition in a rear-end searching range, and correlates positional information of the low level reflecting point as rear-end positional information with the high level reflecting point used as (Continued)

reference of the searching range. The object detecting means detects the object surrounding the vehicle.

5 Claims, 8 Drawing Sheets

(51) Int. Cl.
*G01S 13/931* (2020.01)
*G01S 13/34* (2006.01)
*G08G 1/16* (2006.01)

(52) U.S. Cl.
CPC ...... *G01S 2013/9321* (2013.01); *G08G 1/165* (2013.01); *G08G 1/166* (2013.01)

(58) Field of Classification Search
USPC .......................................................... 342/91
See application file for complete search history.

(56) References Cited

U.S. PATENT DOCUMENTS

| | | |
|---|---|---|
| 2012/0007767 A1 | 1/2012 | Maeno |
| 2013/0207834 A1 | 8/2013 | Mizutani et al. |
| 2015/0048968 A1 | 2/2015 | Uyama et al. |

\* cited by examiner

OBJECT DETECTING APPARATUS USING REFLECTION POINT INFORMATION OF OBJECT

CROSS-REFERENCE TO RELATED APPLICATION

This application is based on and claims the benefit of priority from earlier Japanese Patent Application No. 2014-243324 filed Dec. 1, 2014, the description of which is incorporated herein by reference.

BACKGROUND OF THE INVENTION

Technical Field

The present disclosure relates to an object detecting apparatus. In particular, the present disclosure relates to an object detecting apparatus that generates information about an object surrounding a vehicle.

Background Art

An object detecting apparatus that detects various objects surrounding a vehicle has been known, in which radar waves (radar waves, millimeter-waves or the like) as transmission waves are periodically radiated into the surroundings of the vehicle within a predetermined angle range, and reflection waves are received, thereby detecting various objects around the vehicle. For example, JP-A-H08-279000 discloses an object detecting apparatus adapted for an automatic cruise control (ACC) or the like. The automatic cruise control (ACC) detects a vehicle running ahead of the running direction of the own vehicle in the same lane as the own vehicle. That is, the ACC detects a preceding vehicle so as to maintain an inter-vehicle distance to the preceding vehicle to be constant, or controls a travelling speed to be at a predetermined constant speed when no preceding vehicle is present.

CITATION LIST

Patent Literature

[PTL 1] JP-A-H8-279099

However, when detecting a location of the preceding vehicle by using the radar waves, the following problem arises. Since the reflecting point that reflects the radar waves changes its location, depending on the shape of the preceding vehicle, the distance between the own vehicle and the preceding vehicle significantly changes.

Figure 7:
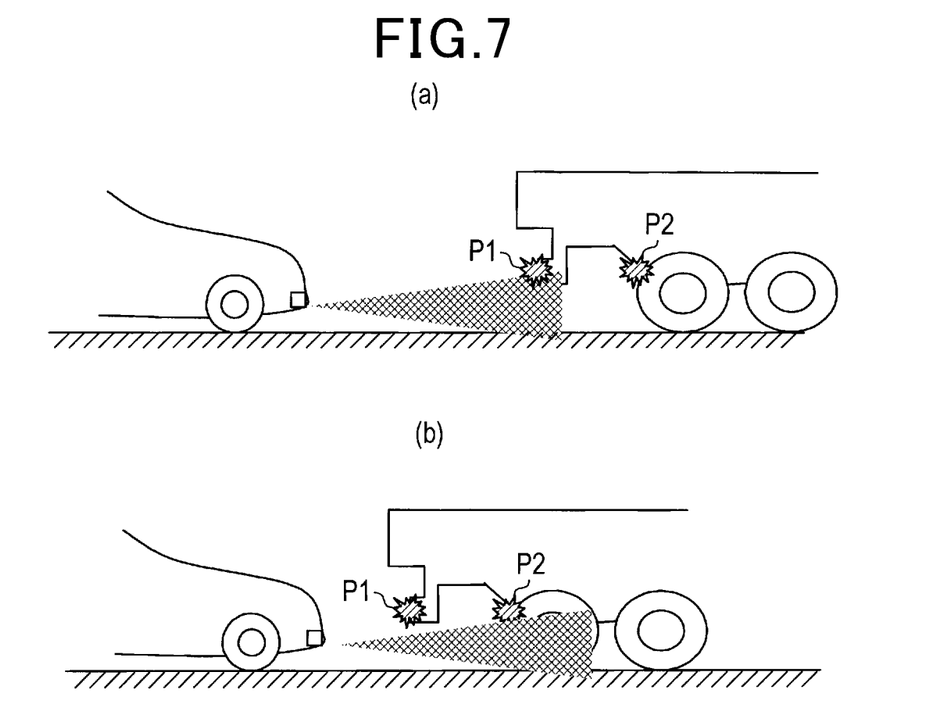
FIG. 7 is an explanatory diagram showing a state where a problem arises about positional information of an object to be detected, where a graph (a) shows a state in which a normal detection is performed, and a graph (b) shows a state in which erroneous detection has been occurred.

Specifically, for example, in the case where a preceding vehicle such as a truck has a rear end portion located at a higher position, when the own vehicle and the preceding vehicle are required to maintain sufficient distance, radar waves are radiated to the rear end portion of the preceding vehicle as shown in FIG. 7(a), and the rear end portion is detected as a reflecting point. Hence, in this case, the correct distance can be detected. However, when the own vehicle and the preceding vehicle approach each other thereby shortening the distance therebetween, as shown in FIG. 7(b), since the rear end portion of the preceding vehicle is not irradiated, but instead a deeper position in the preceding vehicle is irradiated, the deeper position then being detected as a reflecting point. As a result, longer distance is detected than the actual inter-vehicle distance.

Figure 8:
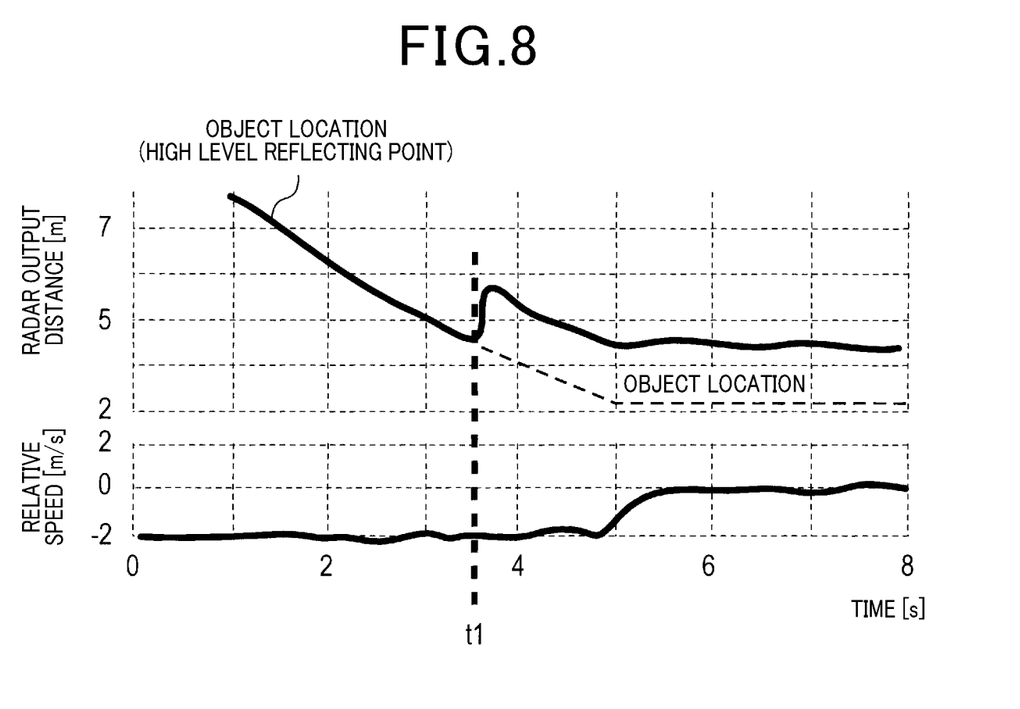
FIG. 8 is a graph that exemplifies a detection result of the positional information and a relative speed which are detected under the state shown in FIG. 7.

In other words, as shown in FIG. 8, when vehicles are approaching each other at a constant relative speed, the inter-vehicle distance detected by the radar apparatus is shortened at a constant rate. However, when the vehicles approach each other and reach a distance (i.e. critical distance) at which the rear end portion of the preceding vehicle is not irradiated by the radar waves (see time t1), a distance larger than the actual inter-vehicle distance is continuously detected while a distance shorter or equal to the critical distance is maintained. When executing ACC or PCS (pre-crash safety system) control in accordance with these detection results, because of a delay in the control timing, various problems may arise.

Figure 9:
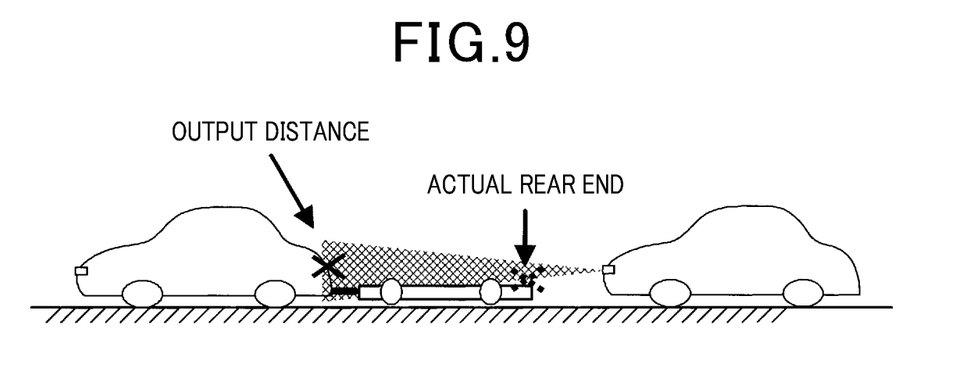
FIG. 9 is an explanatory diagram showing a state where a problem arises about positional information of an object to be detected.

Further, as shown in FIG. 9, in the case where the preceding vehicle has a lower rear end portion, the above-mentioned problems may arise because the radar waves cannot irradiate the rear end portion when the vehicles approach each other within a certain distance.

SUMMARY

The present disclosure provides an object detecting apparatus that reduces occurrence of erroneous detections of distance to an object.

Solution to Problem

An object detecting apparatus according to the present disclosure is provided with reflecting point detecting means, reflecting point setting means, rear-end positional information generating means and object detecting means. The reflecting point detecting means detects a position and a speed of a reflecting point at every predetermined measurement cycle in which radar waves are transmitted and received and the reflecting point reflects the radar waves. The reflecting point setting means sets a high level reflecting point and a low level reflecting point for the reflecting point detected by the reflecting point detecting means, the high level reflecting point having a reflection intensity higher than or equal to a predetermined first detecting threshold, the low level reflecting point having a reflection intensity higher than or equal to a second detecting threshold and lower than the first detecting threshold, the second detecting threshold being lower than the first detecting threshold. The rear-end positional information generating means checks, at each high level reflecting point, whether or not a low level reflecting point is present satisfying a same object condition set in advance in a rear-end searching range set in a vehicle side with respect to the high level reflection point, and correlates positional information of the low level reflecting point as rear-end positional information, when being present in the rear-end searching range, with the high level reflecting point used as a reference of the rear-end searching range. The object detecting means detects the object surrounding the vehicle by using information about the high level reflecting point.

Even in the case where the vehicle approaches the object and the reflection intensity at the rear-end portion of the object becomes lower than the first detecting threshold, it is not the case that no radar waves at all are irradiated to the rear-end portion of the object, but reflection waves having weak intensity are continuously received. Accordingly, the second detection threshold is used to detect the lower level reflection point existing within the rear-end searching range and satisfying the same object condition, thereby detecting the position of the rear-end portion of the object. In other words, the rear-end positional information indicating a position of the rear-end portion is generated by not only using the high level reflecting point to perform an object detection similar to related art technique, but also using the low level reflecting point.

Such a configuration can prevent erroneous detection of the rear-end position of the object.

It should be noted that the bracketed reference signs in the claims indicate correspondence to specific means as one aspect in the embodiments described later, and do not limit the technical scope of the present disclosure.

DETAILED DESCRIPTION OF PREFERRED EMBODIMENTS

With reference to the drawings, hereinafter, embodiments according to the present disclosure will be described. The configurations of the present embodiment are as follows.

Figure 1:
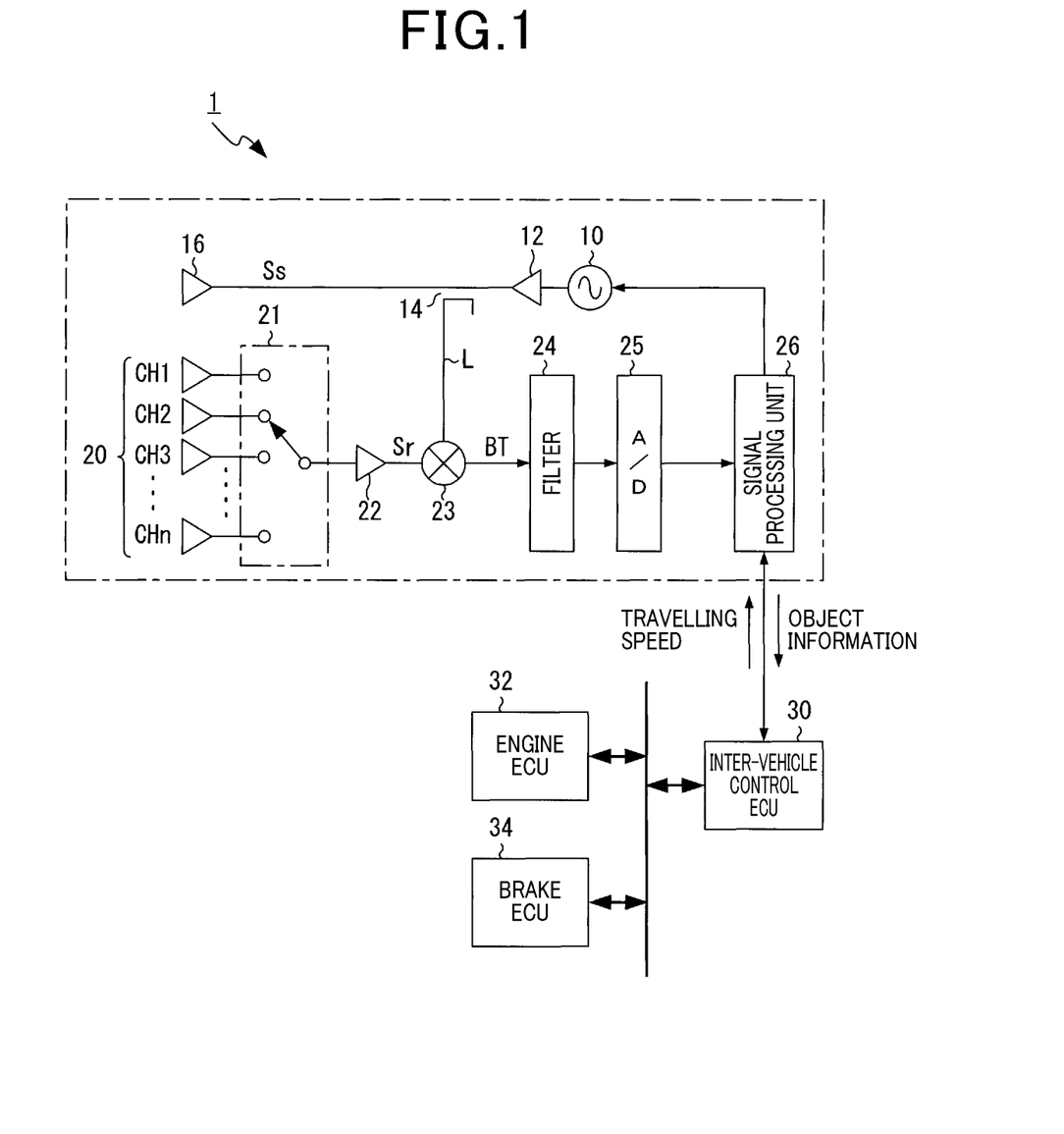
FIG. 1 is a block diagram showing a configuration of a vehicle control system.

A vehicle control system according to the present disclosure is mounted on a vehicle and provided with, as shown in FIG. 1, an inter-vehicle control electronic control unit (hereinafter referred to as inter-vehicle control ECU) 30, an engine electronic control unit (hereinafter referred to as engine ECU) 32, and a brake electronic control unit (hereinafter referred to as brake ECU) 34. These units are connected to each other via a communication bus that constitutes an on-vehicle local area network (LAN). Each of the ECUs 30, 32, and 34 are configured of mainly a known microcomputer together with at least a bus controller to perform a communication through a communication bus.

An alarm buzzer, a cruise control switch, a target inter-vehicle distance setting switch or the like which are not shown, and a radar sensor 1 are connected to the inter-vehicle control ECU 30.

The radar sensor 1 is configured of a so-called millimeter wave radar adapted for a FMCW method, where a preceding vehicle and road side object or the like are recognized by transmitting/receiving millimeter-wave-band frequency modulated radar waves, and object information about the recognized objects (hereinafter referred to as recognized object) is generated and transmitted to the inter-vehicle control ECU 30.

It should be noted that the object information includes a position of the recognized object, a distance to the recognized object and a relative speed or the like.

Hereinafter, the brake ECU will be described. The brake ECU 34 is configured to transmit the detection information (steering angle, yaw rate) from the steering sensor (not shown) and the yaw rate sensor, and a state of the brake pedal determined based on the information transmitted from the M/C pressure sensor (not shown), to the inter-vehicle control ECU 30; receive a target acceleration factor, a brake request or the like from the inter-vehicle control ECU 30; and drive the brake actuator which opens/closes a boosting control valve/a pressure reducing valve provided in a brake hydraulic circuit, in accordance with the received information and determined brake state, thereby controlling the braking force.

The engine ECU will be described as follows.

The engine ECU 32 is configured to transmit the detection information (travelling speed, engine control state, accelerator operating state) from a traveling speed sensor, a throttle opening sensor, an acceleration pedal opening sensor which are not shown, to the inter-vehicle control ECU 30, receive a target acceleration factor, a fuel cut request or the like from the inter-vehicle control ECU 30; and output a drive request to a throttle actuator or the like which adjusts the throttle opening of the internal combustion engine depending on an operation state identified by these received information.

Hereinafter, the inter-vehicle control ECU will be described.

The inter-vehicle control ECU 30 receives a travelling speed, an engine control state from the engine ECU 32, a steering angle, a yaw rate and a brake control state or the like from the brake ECU 34. Also, the inter-vehicle control ECU 30 transmits, based on setting values of a cruise control switch, a target inter-vehicle distance setting switch or the like and the object information received by the radar sensor 1, a target acceleration factor, a fuel cut request or the like to the engine ECU 32, as a control command to maintain appropriate inter-vehicle distance to the preceding vehicle, and transmits a target acceleration factor and a brake request or the like to the brake ECU 34. Moreover, the inter-vehicle control ECU 30 is configured to determine whether or not an alert has occurred, and sound the alert buzzer when it is necessary.

Here, detailed configuration of the radar sensor 1 will be described.

The radar sensor 1 is provided with an oscillator 10, an amplifier 12, a distributor 14, a transmission antenna 16, a reception antenna 20, a reception switch 21, an amplifier 22, a mixer 23, a filter 24, an A/D converter 25 and a signal processing unit 26.

The oscillator 10 generates a modulated millimeter-band high frequency signal having an ascending section where the frequency linearly increases with time, and a descending section where the frequency linearly decreases with time. The amplifier 12 amplifies the high frequency signal generated by the oscillator 10. The distributor 14 distributes the output power of the amplifier 12 into the transmission signal Ss and the local signal L. The transmission antenna 16 radiates radar waves in response to the transmission signal Ss. The reception antenna 20 is configured of n reception antennas which receive the radar waves. The reception switch 21 sequentially selects one of antennas which configure the reception antenna 20, and supplies the received signal Sr from the selected antenna to the latter part. The amplifier 22 amplifies reception signal Sr supplied by the reception switch 21. The mixer 23 mixes the received signal Sr which is amplified by the amplifier 22 and the local signal L, thereby generating a beat signal BT. A filter 24 removes unnecessary signal component from the beat signal BT generated by the mixer 23. The A/D converter 25 samples the output of the filter 24 and converts the sampled signal to the digital data. The signal processing unit 26 controls an activation/deactivation of the oscillator 10 and the sampling of the beat signal BT performed by the A/D converter. Also, the signal processing unit 26 performs signal processing using the sampled data, and communicates with the inter-vehicle control ECU 30 so as to transmit/receive necessary information (traveling speed) for the signal processing and information (target information) obtained as a result of the signal processing.

Each of the antennas that configure the reception antenna 20 is set such that each beam width includes the entire beam width of the transmission antenna 16. Each antenna is assigned to respective channels CH1 to CHn.

The signal processing unit 26 is configured of mainly a known microcomputer. Further, the signal processor unit 26 includes a processing unit (e.g., DSP) for executing a Fast Fourier Transformation (FFT) or the like for acquired data via the A/D converter 25.

Hereinafter, an operation of the radar sensor will be described.

According to the radar sensor 1 of the present embodiment thus configured, when the oscillator 10 is activated in response to the signal processing unit 26, high frequency signal is generated by the oscillator 10, amplified by the amplifier 12 and power-distributed by the distributor 14, whereby the transmission signal Ss and the local signal L is generated. The transmission signal Ss among these signals is transmitted from the transmission antenna 16 as radar waves.

The reflection waves where radar waves radiated from the transmission antenna 16 are reflected at an object and returned to the radar sensor 1 are received by entire reception antennas which configure the reception antenna 20. Then, only the reception signal Sr from the reception channel Chi (i=1 to n) selected by the reception switch 21 is amplified by the amplifier 22 and supplied to the mixer 23. The mixer mixes the local signal L from the distributor 14 with the reception signal Sr to generate the beat signal BT. The beat signal BT is sampled by the A/D converter 25 after eliminating unnecessary signal components at the filter 24, and acquired by the signal processing unit 26.

The reception switch 21 is switched during one modulation period of the radar waves such that every channels from CH1 to CHn is selected for a predetermined times (e.g., 512 times). The A/D converter 25 performs a sampling synchronizing to this switching timing. In other words, during one modulation period of the radar waves, sampling data is stored and accumulated for every channel CH1 to CHn and every ascending section and descending section.

Next, process executed by the signal processing unit 26 will be described.

In a ROM included in the signal processing unit 26, at least a program is stored, corresponding to a process which will be described later.

Figure 2:
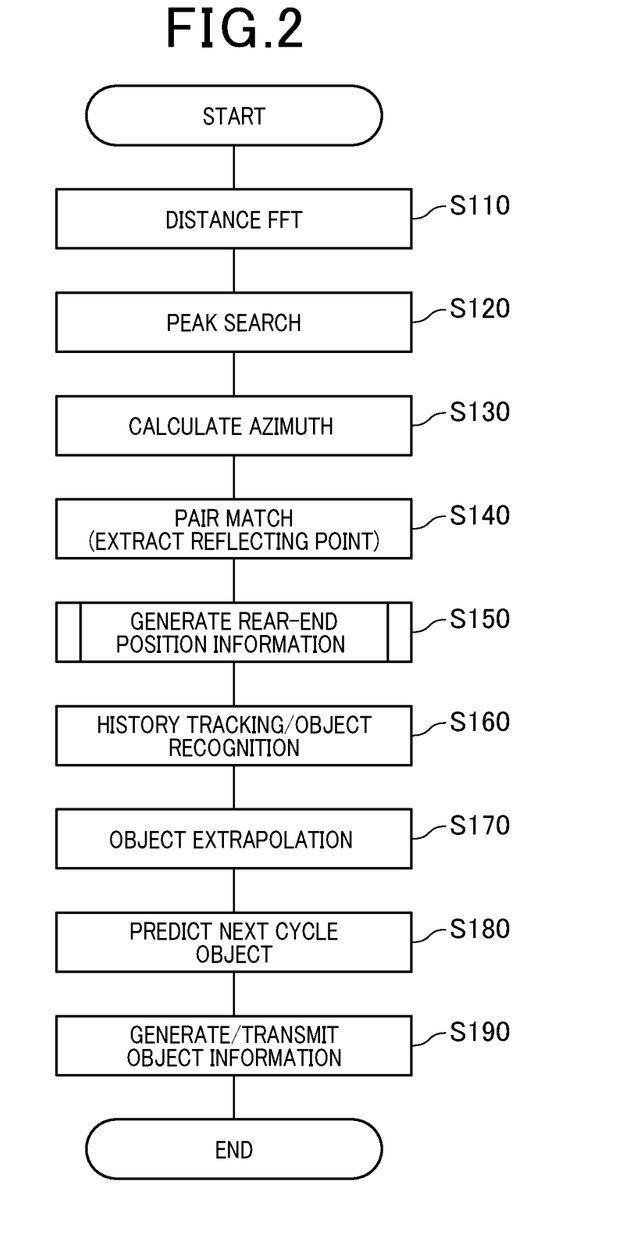
FIG. 2 is a flowchart showing a main process executed by a signal processing unit.

A main process executed by the signal processing unit 26 will be described using a flow chart shown in FIG. 2. This process is repeatedly executed as a measurement cycle of one modulation period of the radar waves.

The CPU that configures the signal processing unit 26, once the process is activated, executes a frequency analysis process (FFT process in this process) for sampling data accumulated in the previous measurement cycle corresponding to one modulation period, and calculates a power spectrum of the beat signal BT for every channels 1 to n and every ascending and descending sections of the radar waves.

Figure 5:
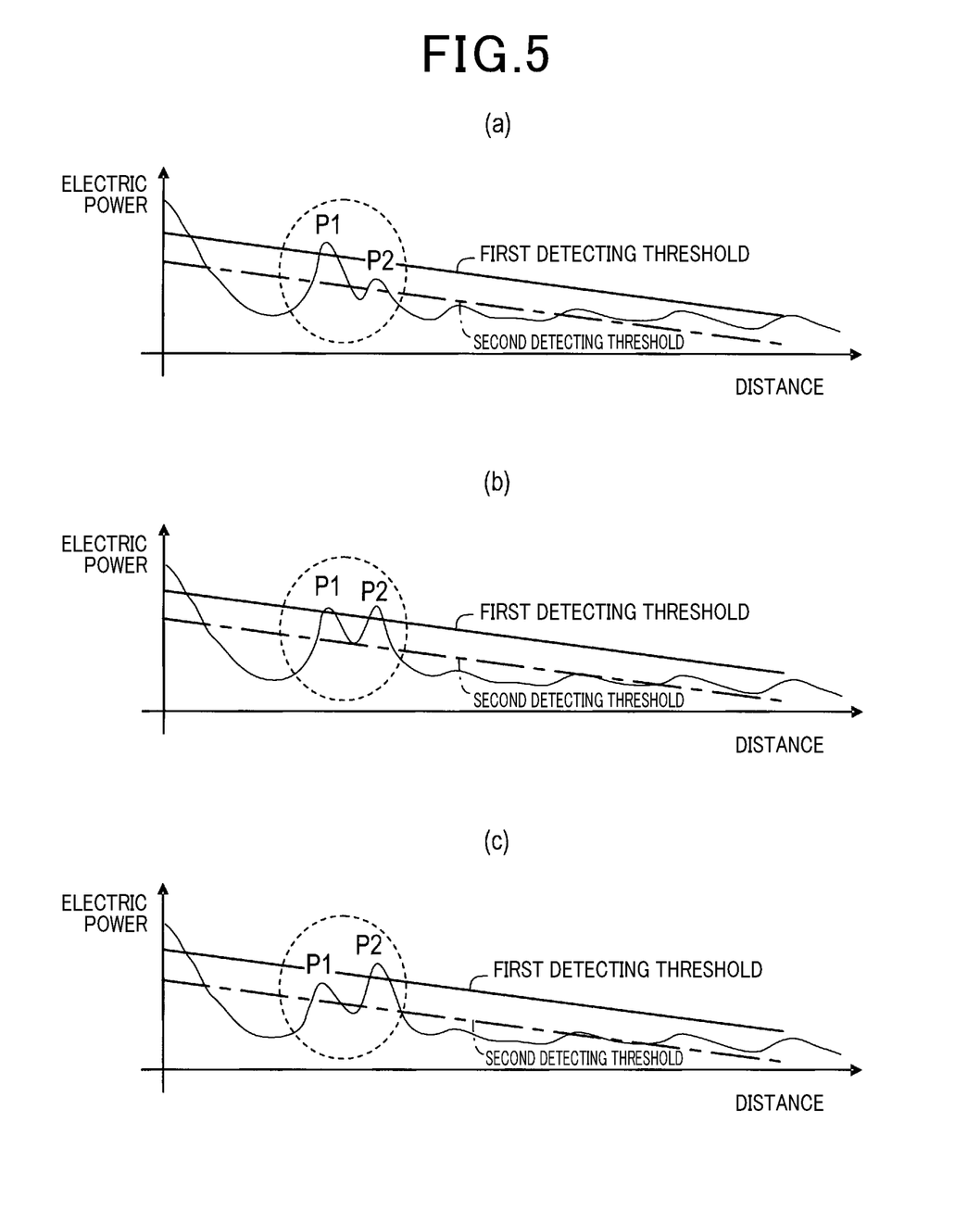
FIG. 5 is an explanatory diagram that exemplifies a state where a high level reflecting point and a low level reflecting point are detected.

At S120, a peak search process is executed so as to extract a frequency component (hereinafter referred to as peak frequency component) which peaks in the power spectrum obtained at S110. A threshold used for detecting the peak includes a first detecting threshold and a second detecting threshold which is set lower than the first detecting threshold. As shown in FIG. 5, these thresholds are set such that the higher the frequency, the lower the threshold value. Here, peaks larger than or equal to the second detecting threshold are detected. The first detecting threshold is set to be the same as a threshold used for detecting peaks in related art.

The peak frequency component extracted in the peak search includes components conforming to a prediction value at S180 which will be described later and other components. Further, when no peak frequency components conforming to a prediction value is present, it is regarded as the peak frequency components being buried in noise or other peak frequency components, and the peak frequency components are extrapolated. It should be noted that "conforming to" refers to a matching within a predetermined allowable range. The signal level of the extrapolated peak frequency component is set to be zero or an equivalent noise level.

At S130, the process executes, for every peak frequency components (excluding extrapolated components) extracted at S120 and every modulation sections, an azimuth calculation process that acquires incoming direction of the reflection waves that generate the peak frequencies. Specifically, a frequency analysis process (i.e., super resolution method such as FFT method, or MUSIC method (multiple signal classification)) is executed for n peak frequency components having the same frequency collected from the channels CH1 to CHn.

At S140, a pair matching process is executed such that peak frequency components extracted at S120 for the ascending section and the descending section are paired. Specifically, peak frequency components extracted at S120 having substantially the same signal level or the incoming direction calculated at S130 are paired (i.e., if the difference between two components are less than or equal to a predetermined determination threshold). Further, among the pairs, by using a known method of FMCW radar, distances and relative speeds are calculated, and genuine pairs (i.e., reflecting points of radar waves) where the calculated distance and traveling speed are less than or equal to the upper limit distance and the upper limit speed respectively are registered. However, in the following process, among the registered genuine pairs, a pair having the reception intensity of at least one peak is larger than or equal to the first detecting threshold is defined as high level reflecting points, and other pairs are defined as low level reflecting points.

At S150, the process executes a rear-end positional information generation process which will be described later.

At S160, the process executes a history tracking process for every high level reflecting point (hereinafter referred to as current cycle reflecting point) registered at S140 in the current measurement cycle. The history tracking process determines whether or not these current cycle reflecting points represent the same object (i.e., whether there is a history connection) corresponding to the high level reflecting points (hereinafter referred to as previous cycle reflecting point) registered at S140 of the previous measurement cycle.

Specifically, based on information of the previous cycle reflecting point, the process calculates a predicted position and a predicted speed of the current cycle reflecting point corresponding to the previous cycle reflecting point. When the difference between the predicted position and the predicted speed, and the detected position calculated from the current cycle reflecting point and the detection speed (positional difference and speed difference) are smaller than a predetermined upper limit (positional difference upper limit, speed difference upper limit), the process determines that there is a history connection. Then, when a high level reflecting point having a history connection for a plurality of measurement cycles (e.g., 5 cycles) is found, the high level reflecting point is determined as an object.

It should be noted that the current cycle reflecting point sequentially takes over information (e.g., the number of history connections, extrapolation counter (described later), extrapolation flag, rear-end positional information or the like) of the previous cycle reflecting point having history connection to the current cycle.

In S170, an object extrapolation process is executed. The object extrapolation process sets an object recognized at S160 in the current cycle to be a current cycle object, and an object recognized at S160 in the previous cycle to be a previous cycle object. When the previous cycle object having no history connection with the current cycle object is present, the object extrapolation process generates an extrapolation pair based on the predicted value about the previous cycle object, and adds the extrapolation pair in the current cycle object.

In each of the current cycle objects, an extrapolation flag indicating presence or absence of the extrapolation, and an extrapolation counter indicating the number of extrapolations which are continuously extrapolated are set. When the current cycle object is based on an actual pair which is actually detected, the extrapolation flag GF and the extrapolation counter are reset. When the current cycle object is based on an extrapolation pair, the extrapolation flag GF is set to 1 and the extrapolation counter is incremented. Then, when the counter value of the extrapolation counter reaches a predetermined discard threshold, the process discards the object as a lost object.

At S180, a next cycle prediction process is executed for every current cycle object registered in S160 and S170, to acquire peak frequency to be detected and azimuth angle to be detected in the next cycle.

At S190, the process generates, for every recognized object, object information including a speed, a location, an azimuth angle and a rear-end position predicted at S150, and transmits the object information to the inter-vehicle control ECU 30, and the process is terminated.

Figure 3:
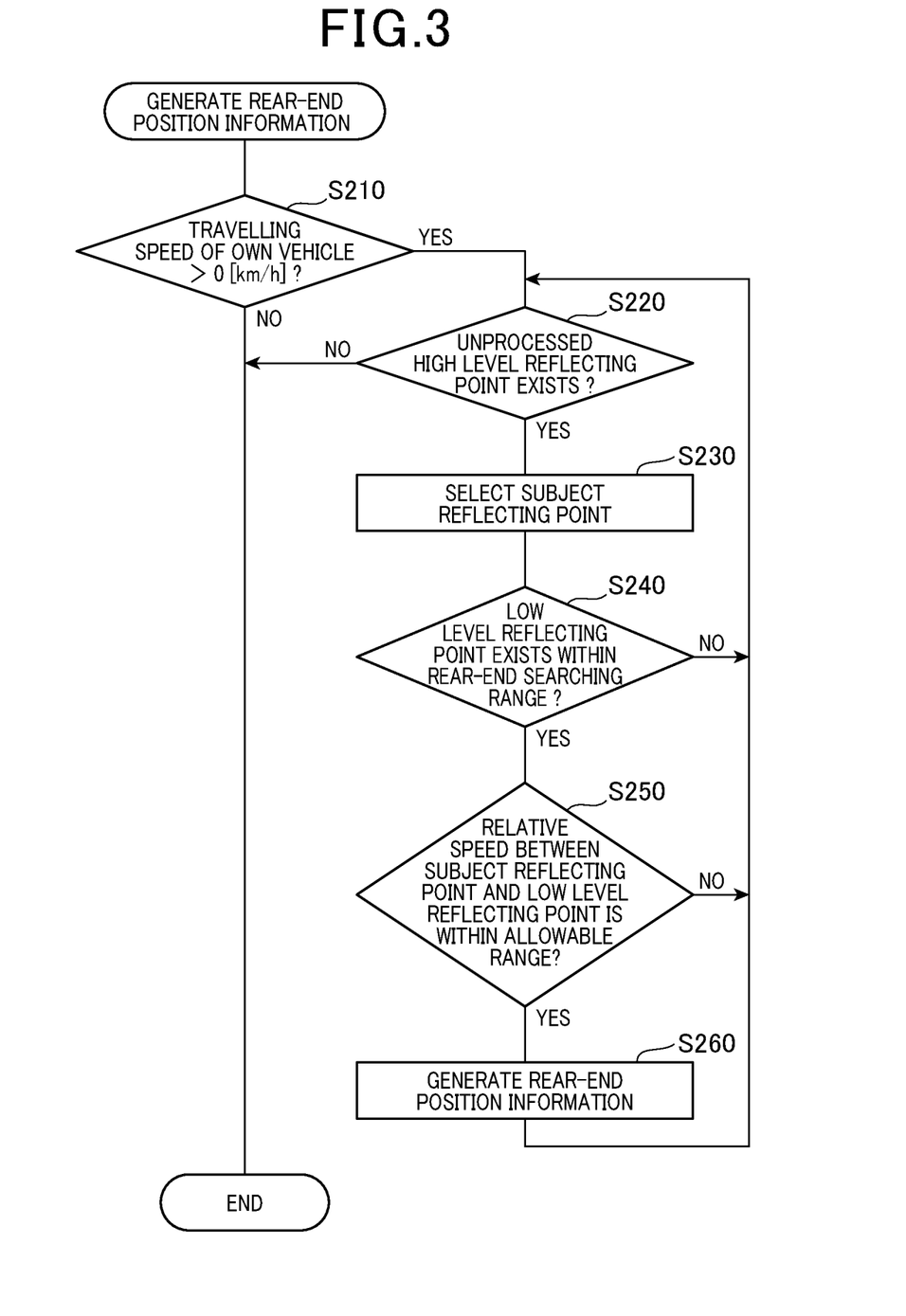
FIG. 3 is a flowchart showing a flowchart showing a rear end pair information generating process.

Next, with reference to a flowchart shown in FIG. 3, the rear-end positional information generation process executed at S150 will be described in detail.

The CPU which configures a signal processing unit 26 determines whether or not the traveling speed of the own vehicle is larger than 0 [km/h] at S210, that is, whether or not the own vehicle is advancing forward. When the traveling speed of the own vehicle is 0 [km/h] or less (S210: NO), the process is terminated. When the traveling speed of the own vehicle is larger than 0 [km/h] (S210: YES), the process proceeds to S220.

At S220, the process determines whether or not unprocessed high level reflecting point (i.e., following processes S230 to 260 are not executed) are present among registered high level refection points registered at S140. When no unprocessed high level reflecting points exists (S220: NO), the process is terminated. When the unprocessed high level reflecting points are present (S220: YES), the process selects one of the unprocessed high level reflecting point to be a subject reflecting point.

Figure 4:
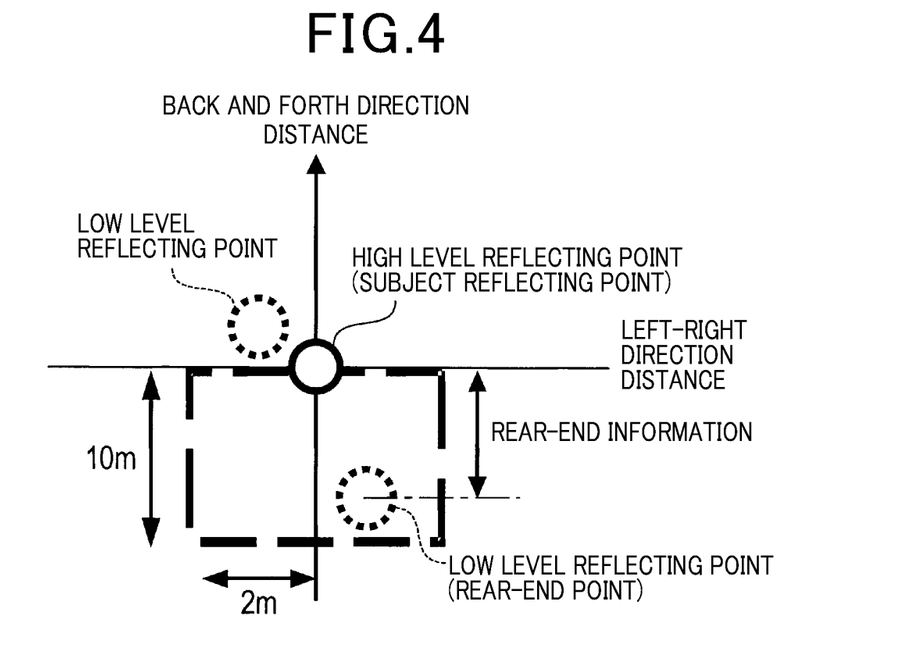
FIG. 4 is an explanatory diagram showing a search range of a rear end pair.

At subsequent step S240, the process determines whether or not low level reflecting points exist within a rear-end searching range which is set with respect to the subject reflecting point. It should be noted that the rear-end searching range is defined in a left-right direction with respect to the subject reflecting point as the center thereof, i.e., ±2 m in the vehicle width direction, and in a backward direction from the subject reflecting point, i.e., 10 m in a direction approaching the own vehicle shown in FIG. 4, for example.

When the low level reflecting points do not exist (S240: NO) within the rear-end point searching range, the process returns to S220, and when the low level reflecting points exist (S240: YES), the process proceeds to S250.

At S250, the process determines whether or not a predetermined same object condition is satisfied for the low level reflecting points within the rear-end searching range and the subject reflecting point. As the same object condition, a condition that both reflecting points are within a predetermined allowable range (e.g., ±5 [km/h]) is used.

When the same object condition is not satisfied (S250: NO), the process returns to S220 and when the same object condition is satisfied (S250: YES), the process proceeds to S260.

At S260, the process generates rear-end positional information representing a distance between the low level reflecting point that satisfies the same object condition and the subject reflecting point, and correlates the information with the subject reflecting point, and returns to S220.

In the case where a plurality of high level reflecting points are present in the same object, maximum rear-end positional information in the high level reflecting points is defined as the rear-end positional information of the object.

An operation example will be described. For example, when a state shown in FIG. 7(a) is assumed, as shown in FIG. 5(a), peaks are detected based on a reflecting point P1 in the rear-end portion and a reflection portion P2 in deeper portion. In this case, peaks are detected such that the reflecting point P1 is high level reflecting point, and the reflecting point P2 is low level reflecting point. For the reflecting point P1 which is a high level reflecting point, the rear-end positional information generation process is executed, in which the rear-end positional information is not generated because a low level reflecting point is not present in near the own vehicle side. Alternatively, a rear-end positional information indicating that the distance to the rear-end point is 0 m is generated.

When the own vehicle more approaches the preceding vehicle under the state shown in FIG. 7(a), as shown in FIG. 5(b), the reflecting points P1 and P2 are extracted as high level reflecting points. Since low level reflecting points are not present in near own-vehicle side than the reflecting points P1 and P2, the rear-end positional information is not generated in this case as well. It should be noted that the reflecting points P1 and P2 are recognized as reflecting points belonging to the same object at the history tracking/ object recognition process (S160).

In a state shown in FIG. 7(a), where the own vehicle more approaches the preceding vehicle, as shown in FIG. 5(c), the reflecting point P1 and the reflecting point P2 are extracted as low level reflecting point and high level reflecting point respectively. Since the reflecting point P1 as a low level reflecting point is present closer to the own vehicle than the high level reflecting point P2 is, as the rear-end positional information about the reflecting point P2, the process generates information representing a distance between the reflecting point P1 and the reflecting point P2.

Figure 6:
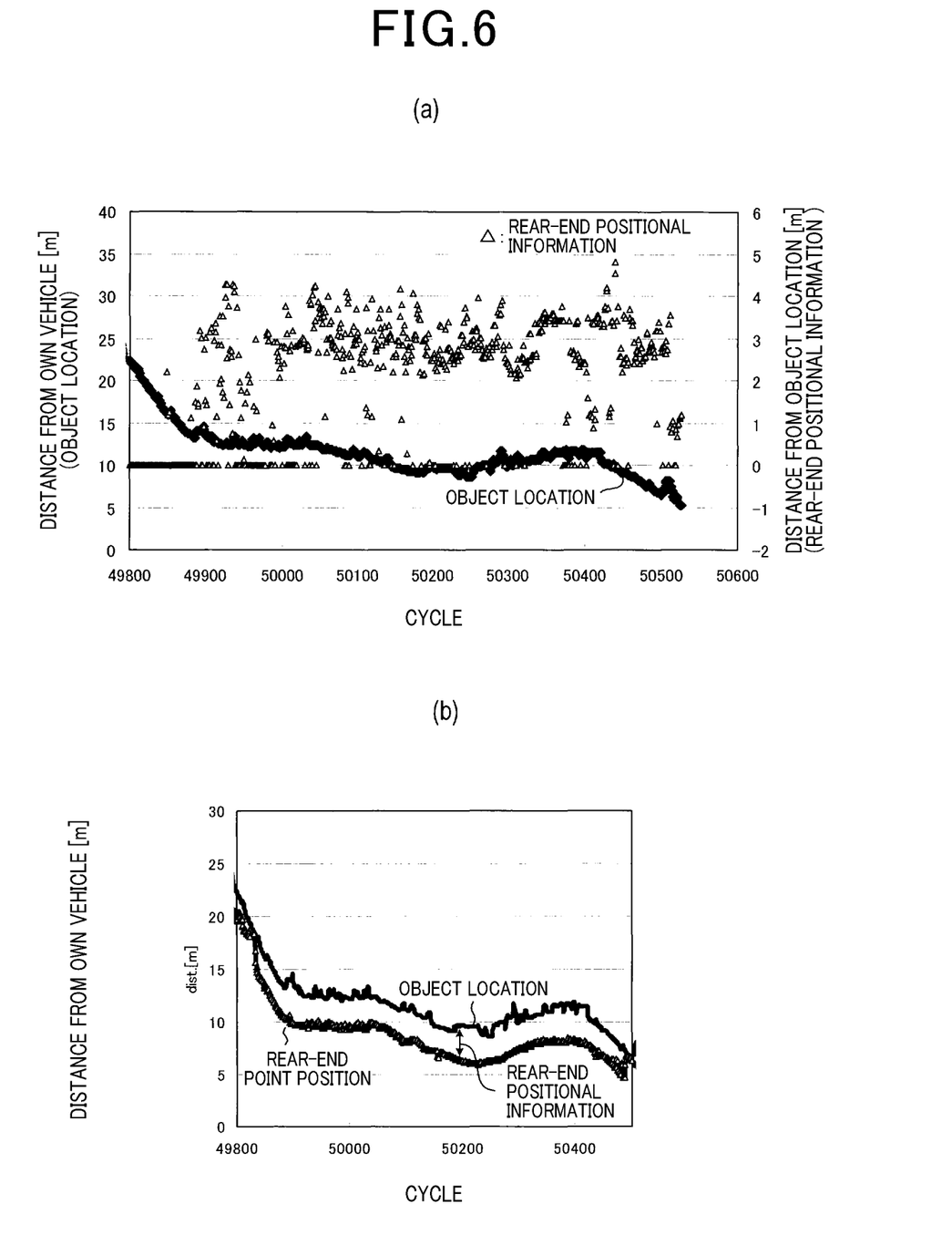
FIG. 6 is a graph exemplifying a detection result of a position of the high level reflecting point and corresponding position of the rear end portion, where a graph (a) shows detection result of the rear end points and a graph (b) shows a detection result with a filtering process.

As shown in FIG. 6(a) the rear-end positional information thus detected includes variations. Hence, in the process of generating/transmitting the object information (S190), as shown in FIG. 6(b), the process may generate/transmit information where low-pass filter processing is added to the rear-end positional information. It should be noted that FIG. 6(a) is a graph where an object position and rear-end positional information (distance between the object position and the rear-end point) are plotted. FIG. 6(b) represents positions of the object and the rear-end portion. In other words, the interval between two plots of FIG. 6(b) in the vertical axis represents rear-end positional information.

As described, according to the present embodiment, basically, the object is detected by using a high level reflecting point, and the rear-end positional information about the rear-end position of the object is generated by using a low level reflecting point. Hence, erroneous detection of the rear-end position of the object necessary for controlling ACC or PCS can be minimized. As a result, reliability of various controls which use the position of the object can be enhanced.

[Other Embodiment]

As described above, embodiment of the present disclosure has been described. The present disclosure is not limited to the above-described embodiment, but may be modified in various ways.

(1) According to the above-described embodiment, the rear-end positional information is generated for every reflecting point (pair) detected by a pair matching (S140). However, the rear-end positional information may be generated for every object recognized by the history tracking/ object recognition processes (S160).

(2) According to the above-described embodiment, generation of the rear-end positional information is enabled only when the own vehicle is running forward, but may be always enabled regardless of the own vehicle running or stopped.

(3) A plurality of functions included in a single element of the above-described embodiments may be distributed a plurality of elements, or functions included in a plurality of elements may be integrated to one element. A part of configurations of the above-described embodiments can be replaced by known configuration. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by only terms in the scope of claims are defined as embodiments of the present disclosure.

(4) The object detecting apparatus according to the present disclosure can be achieved by various modes other than the above-described radar apparatus, including a system including the radar apparatus, a program having a computer function as a signal processing unit 26 (object detecting apparatus) of the radar apparatus, a media to which the program is recorded, and an object detecting method.

REFERENCE SIGNS LIST

1: radar sensor
10: oscillator
12, 22: amplifier
14: distributed
16: transmission antenna
20: reception antenna
21: reception switch
23: mixer
24: filter
25: A/D converter
26: signal processing unit
30: inter-vehicle control ECU
32: engine ECU
34: brake ECU

The invention claimed is:

1. An object detecting apparatus mounted on a vehicle, generating information about objects positioned in a surrounding area of the vehicle, the apparatus comprising:
a reflecting point detecting means for detecting a position and a speed of a reflecting point at every predetermined measurement cycle in which radar waves are transmitted and received, the reflecting point reflecting the radar waves;
a reflecting point setting means for setting a high level reflecting point and a low level reflecting point for the reflecting point, the high level reflecting point having a reflection intensity higher than or equal to a predetermined first detecting threshold, the low level reflecting point having a reflection intensity higher than or equal to a second detecting threshold and lower than the first detecting threshold, the second detecting threshold being lower than the first detecting threshold;
a rear-end positional information generating means for
checking, for each high level reflecting point, whether or not a respective low level reflecting point of a corresponding high level reflecting point of a corresponding reflecting point satisfies a predetermined same object condition and is present in a rear-end searching range, the rear-end searching range being defined in a vehicle width direction with respect to the high level reflecting point, and
correlating positional information of the respective low level reflecting point as rear-end positional information of the corresponding reflecting point based on the respective low level reflecting point being present in the rear-end searching range; and
an object detecting means for detecting an object positioned in the surrounding area of the vehicle based on the high level reflecting point and the rear-end positional information.

2. The object detecting apparatus according to claim 1, wherein the object detecting means is configured to generate the rear-end positional information of the object for each detected object, by using the rear-end positional information of the high level reflecting point of the object.

3. The object detecting apparatus according to claim 1, wherein the object detecting apparatus is provided with enabling means for enabling the rear-end positional information generating means to operate, when the vehicle is running forward.

4. The object detecting apparatus according to claim 1, wherein the rear-end positional information generating means is configured to use the predetermined same object condition in which a relative speed with respect to the vehicle is set within a predetermined allowable range.

5. A computer-implemented method for detecting objects positioned in a surrounding area of a vehicle, the vehicle equipped with a radar sensor, the method comprising:

detecting, using a processor, a position and a speed of a reflecting point at every predetermined measurement cycle in which radar waves are transmitted and received by the radar sensor, the reflecting point reflecting the radar waves;

setting, using the processor, a high level reflecting point and a low level reflecting point for the reflecting point, the high level reflecting point having a reflection intensity higher than or equal to a predetermined first detecting threshold, the low level reflecting point having a reflection intensity higher than or equal to a second detecting threshold and lower than the first detecting threshold, the second detecting threshold being lower than the first detecting threshold;

checking, using the processor, for each high level reflecting point, whether or not a respective low level reflecting point of a corresponding high level reflecting point of a corresponding reflecting point satisfies a predetermined same object condition and is present in a rear-end searching range, the rear-end searching range being defined in a vehicle width direction with respect to the high level reflecting point;

correlating, using the processor, positional information of the respective low level reflecting point as rear-end positional information of the corresponding reflecting point based on the respective low level reflecting point being present in the rear-end searching range; and detecting, using the processor, an object positioned in the surrounding area of the vehicle based on the high level reflecting point and the rear-end positional information.

\* \* \* \* \*